(12) United States Patent
Wu

(10) Patent No.: US 7,429,185 B1
(45) Date of Patent: Sep. 30, 2008

(54) PLUG-IN MODULE WITH LATCH MECHANISM

(75) Inventor: Jerry Wu, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/897,904

(22) Filed: Aug. 31, 2007

(51) Int. Cl.
*H01R 13/62* (2006.01)

(52) U.S. Cl. .................................................. 439/372

(58) Field of Classification Search .............. 439/372, 439/351–358, 377, 629, 347, 157, 92
See application file for complete search history.

(56) References Cited

U.S. PATENT DOCUMENTS

| | | | | |
|---|---|---|---|---|
| 5,681,175 | A * | 10/1997 | Busse et al. | 439/157 |
| 6,731,510 | B1 * | 5/2004 | Hwang et al. | 361/754 |
| 6,790,087 | B2 | 9/2004 | Ho | |
| 6,802,744 | B2 | 10/2004 | Chiang | |
| 7,244,149 | B1 * | 7/2007 | Wang | 439/629 |
| 2005/0170680 | A1 * | 8/2005 | Miller | 439/372 |
| 2006/0099836 | A1 | 5/2006 | Ho | |
| 2006/0121769 | A1 * | 6/2006 | Hanley et al. | 439/372 |

* cited by examiner

*Primary Examiner*—Jean F Duverne
(74) *Attorney, Agent, or Firm*—Wei Te Chung

(57) ABSTRACT

A plug-in module (100) includes opposite sidewalls (11, 21) parallel to each other and extending along a longitudinal direction parallel to a mating direction of the plug-in module, and a latch mechanism (8). The latch mechanism includes an actuating member (4) and a pair of ejectors (5). The actuating member is rotatably assembled to the sidewalls and includes a pair of actuating arms (42) each formed with an actuating end (43) at one distal end thereof, and an operating portion (41) across the sidewalls along a lateral direction perpendicular to the longitudinal direction and connecting the other distal ends of the pair of actuating arms. The pair of ejectors are rotatably assembled to the sidewalls to cooperate with the actuating ends of the actuating member. The actuating member is configured and arranged such that movement of the operating portion thereof in up-to-down direction results in down-to-upward movement of the actuating arms and the actuating ends to thereby actuate the ejectors outwardly rotate relative to the sidewalls adapted for deflecting the latch tab of the module receptacle to separate the plug-in module from the module receptacle.

13 Claims, 11 Drawing Sheets

PLUG-IN MODULE WITH LATCH MECHANISM

BACKGROUND OF THE INVENTION

1. Field of the Invention

The present invention generally relates to a plug-in module, and more particularly to a plug-in module used for high-speed transmission.

2. Description of Related Art

SFP (Small Form-factor Pluggable), X-SFP and QSFP are all modules for fiber optic transmission or signal transmission. All of the modules are of small size or form factor which is important. The smaller the form factor of the module, the less space taken on a printed circuit board to which it couples. A smaller form factor allows a greater number of modules to be coupled onto a printed circuit board to support additional communication channels. However, the smaller form factor makes it more difficult for a user to handle.

When such a module embedded in a system fails, it is desirable to replace it, particularly when other communication channels are supported by other modules. To replace a failed module, it needs to be pluggable into a module receptacle. While, plugging in a new module is usually easy, it is more difficult to remove the failed module because of other components surrounding it. Additionally, a user should not attempt to pull on cables of the module in order to try and remove a failed module or else the user might cause damage thereto.

A typical release method for a pluggable module is to push in on the module itself and then pull out on the module to release it from a cage assembly or module receptacle. It has been determined than this method is not very reliable with users complaining of the difficulty in removing pluggable modules in such manner. Users often complain that traditional methods offer little leverage in getting a sufficient grip on the module when attempting to pull it out of a module receptacle. Another complaint is that traditional actuators used to remove modules are inaccessible or invisible. Other users complain than once released by the traditional method, it is difficult to withdraw the module out of its cage or module receptacle.

Therefore, designers developed different solutions to solve above problems accounted by the users, such as disclosed by U.S. Pat. Nos. 6,851,867, 6,749,448, 6,884,097, 6,908,323, 7,052,306, 6,824,416 and 7,090,523. The theories of theses patents are substantially the same, that is each module is received in corresponding cage or module receptacle and comprises a pair of sliders with forward ends engaging with tabs of the cage, and a bail or lever capable of rotating to actuate the sliders linearly to separate forward ends of the sliders from the tabs. The action theory of theses patents successfully solve the problems mentioned above. The present invention provides a plug-in module with an improved latch mechanism operating in a theory different from that of these patents while still successfully solving the problems.

BRIEF SUMMARY OF THE INVENTION

Accordingly, an object of the present invention is to provide a plug-in module with improved latch mechanism for unplugging the plug-in module conveniently.

In order to achieve the above-mentioned object, a plug-in module configured for latching engagement with a module receptacle adapted for mounting to a printed circuit board comprises opposite sidewalls parallel to each other and extending along a longitudinal direction parallel to a mating direction of the plug-in module, and a latch mechanism. The latch mechanism comprises an actuating member and a pair of ejectors. The actuating member is rotatably assembled to the sidewalls and comprises a pair of actuating arms each formed with an actuating end at one distal end thereof, and an operating portion across the sidewalls along a lateral direction perpendicular to the longitudinal direction and connecting the other distal ends of the pair of actuating arms. The pair of ejectors are rotatably assembled to the sidewalls to cooperate with the actuating ends of the actuating member. The actuating member is configured and arranged such that movement of the operating portion thereof in up-to-down direction results in down-to-upward movement of the actuating arms and the actuating ends to thereby actuate the ejectors outwardly rotate relative to the sidewalls adapted for deflecting the latch tab of the module receptacle to separate the plug-in module from the module receptacle.

Other objects, advantages and novel features of the invention will become more apparent from the following detailed description of the present embodiment when taken in conjunction with the accompanying drawings.

DETAILED DESCRIPTION OF THE INVENTION

Figure 1:
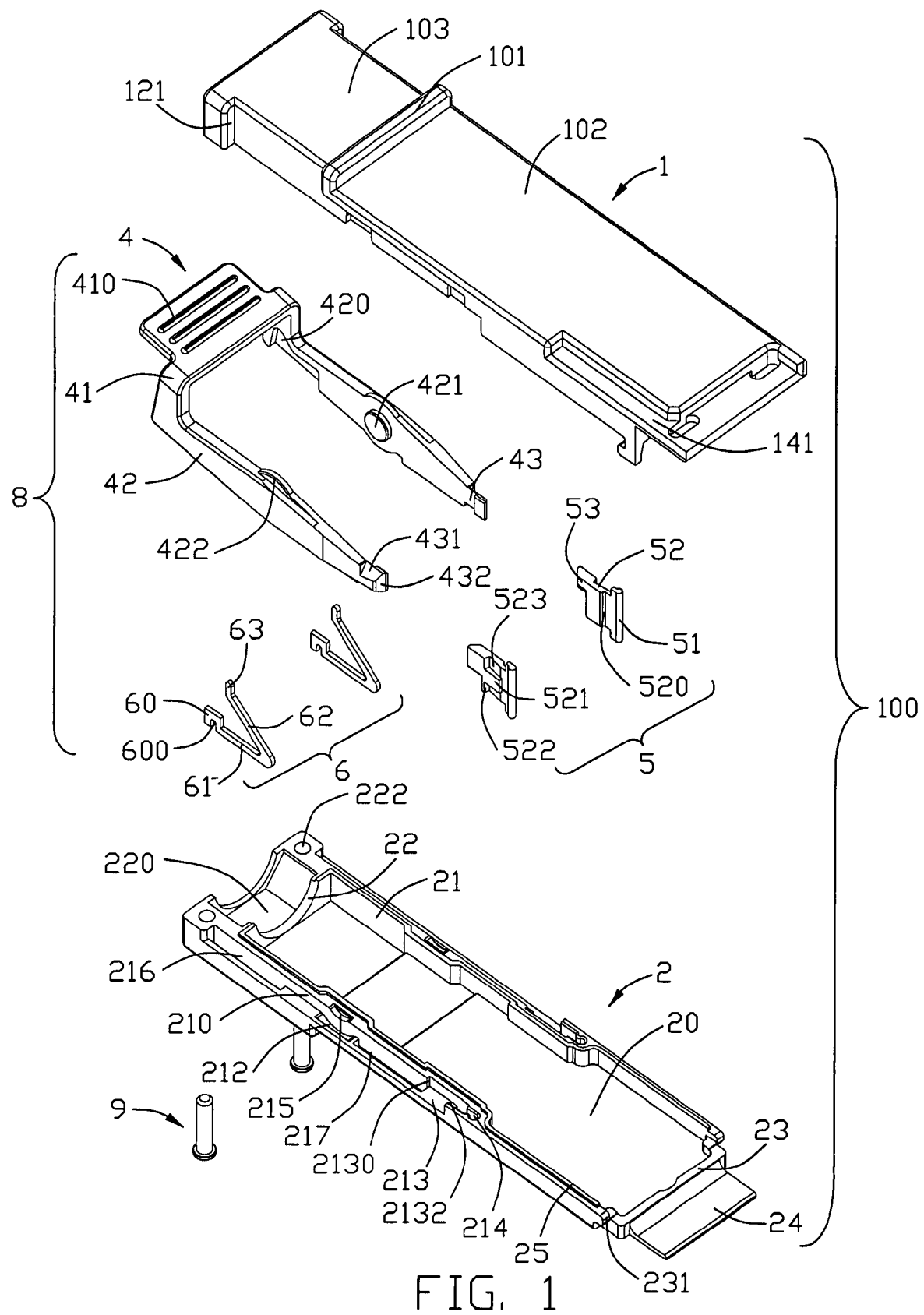
FIGS. 1-2 are exploded, perspective views of a plug-in module in accordance with the present invention and viewed from different aspects.

Reference will now be made to the drawing figures to describe the present invention in detail.

Figure 2:
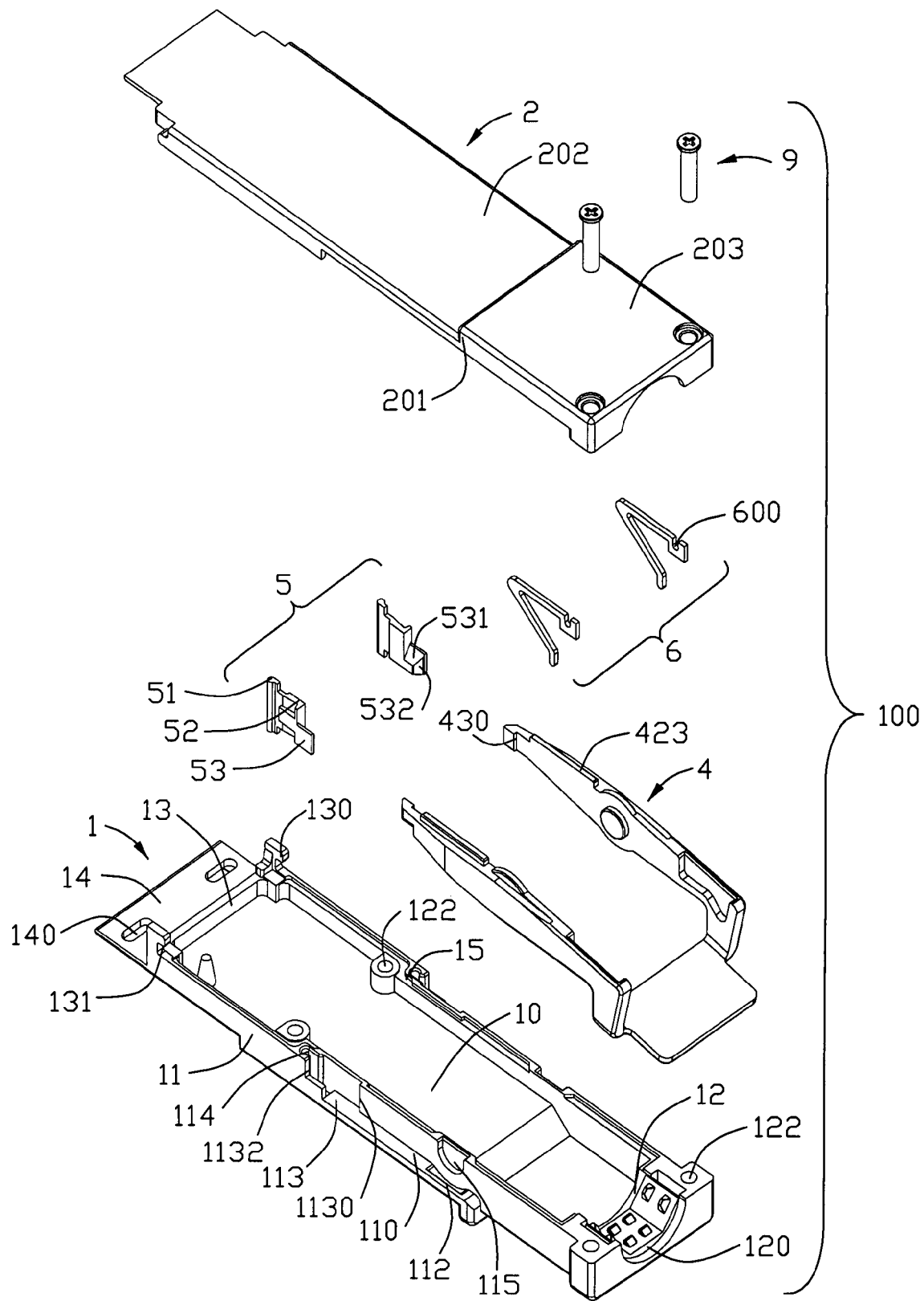
Figure 3:
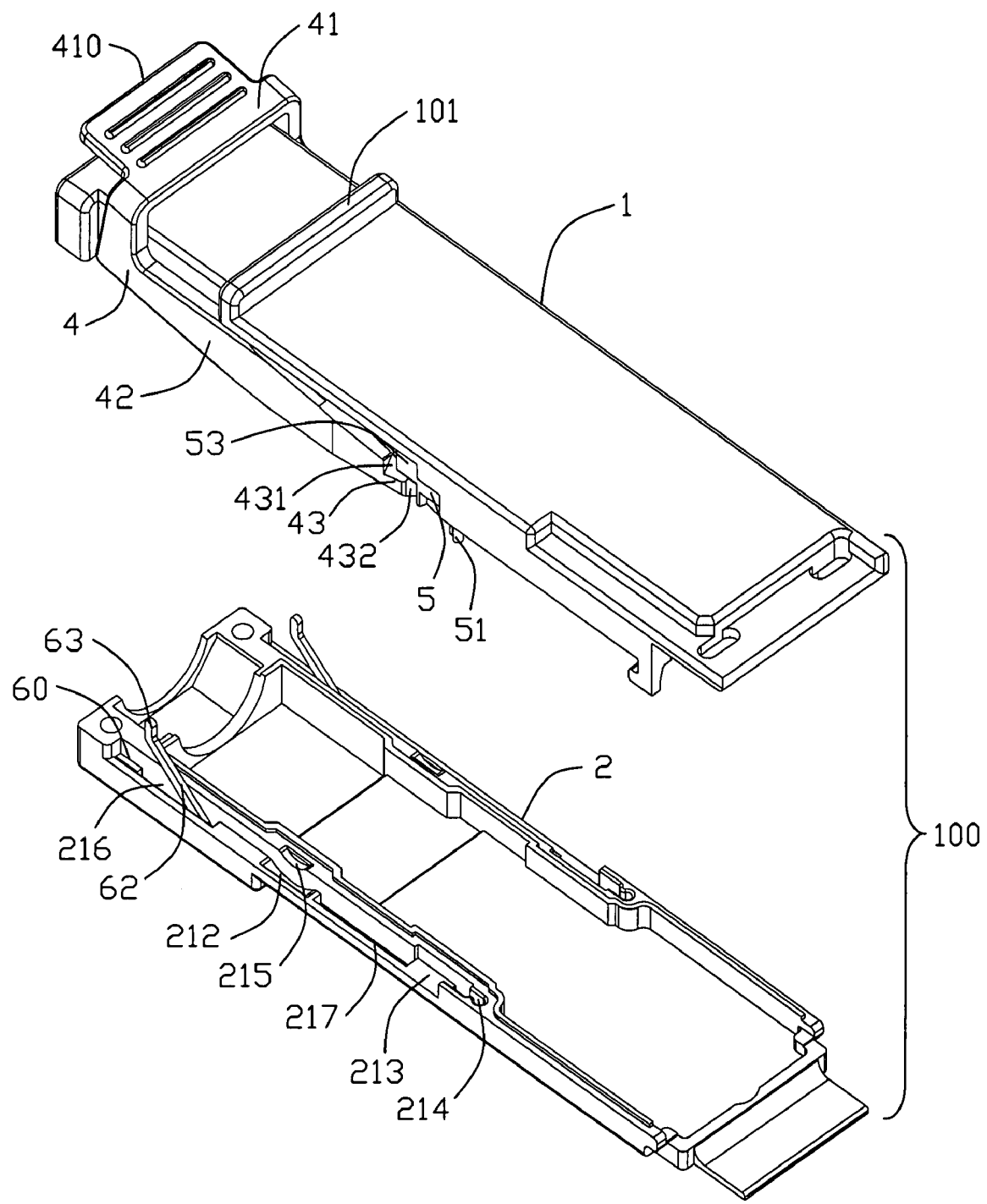
FIGS. 3-5 are partially assembled views of the plug-in module and viewed from different aspects.

Referring to FIGS. 1-3, a plug-in module 100 in accordance with the present invention comprises a base 2, a cover 1 assembled with the base 2 to form a die cast housing 7, and a latch mechanism 8 assembled to the base 2 and the cover 1 for unplugging the plug-in module 100 from a module receptacle (not shown) conveniently. The latch mechanism 8 comprises a die-cast actuating member 4 assembled to the base 2 and the cover 1, a pair of die-cast ejectors 5 assembled to the base 2 and the cover 1 and capable of being actuated by the actuating member 4, and a pair of bias elements 6 assembled to the base 2 and the actuating member 4 for providing elastic restoring force to the actuating member 4. In the preferred embodiment, the plug-in module 100 is a QSFP (Quad Small Form-factor Pluggable) module in accordance with Revision 1.0 of the QSFP Transceiver specification released on Dec. 1, 2006. However, the plug-in module 100 also can be other types of modules without betray the spirit of the present invention.

The cover 1 comprises a step-shape main upper wall 10, a pair of first sidewalls 11 extending downwardly from opposite side edges of the upper wall 10, opposite first front and rear walls 12, 13 with different heights downwardly extending from front and rear edges of the upper wall 10 and connecting with the pair of first sidewalls 11. The upper wall 10 extends forwardly beyond the first front wall 13 to form a first front flange 14 with a pair of elliptical holes 140 laterally arranged. An L-shape cutout 141 recesses downwardly from upper surface of the upper wall 10 and locates at a left corner of the upper wall 10. A first flange 101 is formed on the upper wall 10 to divide the cover 1 into a front first mating section 102 and a rear first installation section 103 which is higher and shorter than the first mating section 102 but lower than the first flange 101. The first flange 101 indicates the final insertion position of the plug-in module 100.

The first installation section 103 forms a pair of ear sections 121 together with the first rear wall 12 and extending laterally beyond the pair of first sidewalls 11. Lower sections of the first flange 101 and middle portions of the first sidewalls 11 are partially cutout with upper flanges thereof left. Thus, a pair of first accommodating spaces 110 which extend from the ear sections 121 till a middle position of the first mating section 102 corresponding to lower contour of the actuating member 4 are formed. An arc-shape first rail recess 112 is recessed upwardly from the upper flange of the first sidewall 11 and locates adjacent to the first flange 101. A first pivot recess 115 is recessed inwardly from outer periphery of first sidewall 11 and locates above the first rail recess 112. A first cooperating recess 113 is recessed inwardly from forward end of the first accommodating space 110 and opens toward outside. A circular first pivot hole 114 recesses upwardly from the first sidewall 11 and communicating with the first cooperating recess 113. The first cooperating recess 113 is of L-shape and communicates with the first pivot hole 114, the first accommodating space 110. The first cooperating recess 113 forms an inner first step 1130 and an L-shape outer second step 1132 respectively corresponding to the contours of the actuating member 4 and the ejector 5.

The first rear wall 12 has a relatively large thickness along mating direction and defines a first semicircular exit opening 120 for the exist of a cable (not shown) and the above-described ear sections 121. A plurality of teeth 121 are formed on inner periphery of the first exit opening 120 for interferentially engaging with the cable. A pair of first fastening holes 122 are defined in the ear sections 121 to locate at opposite sides of the exit opening 120. Another pair of first fastening holes 122 are formed in a pair of standoffs formed adjacent to the first pivot holes 114 all for fastening to the base 2. A pair of tips 130 are formed at two corners of the first front wall 13 and below the first front wall 13 to form a pair of spaces 131 between the bottom surfaces of the first sidewalls 11. A continuous slot 15 recesses upwardly from inner edges of the first sidewalls 11 and the first rear wall 12.

The base 2 comprises a step-shape bottom wall 20, a pair of second sidewalls 21 extending upwardly from opposite side edges of the bottom wall 20, opposite second front and rear walls 22, 23 upwardly extending from front and rear edges of the bottom wall 20 and connecting with the pair of second sidewalls 21.

Figure 7:
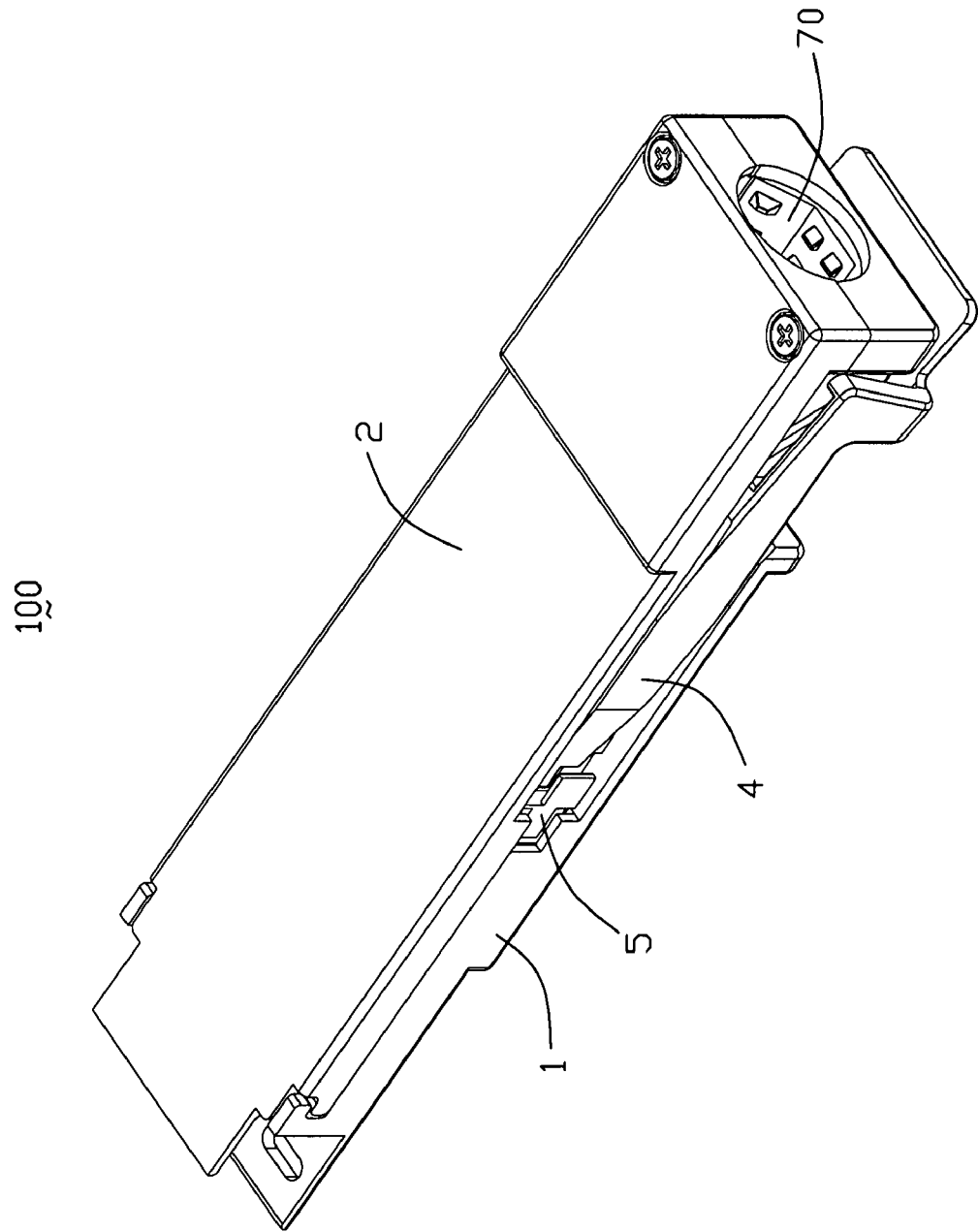
Figure 8:
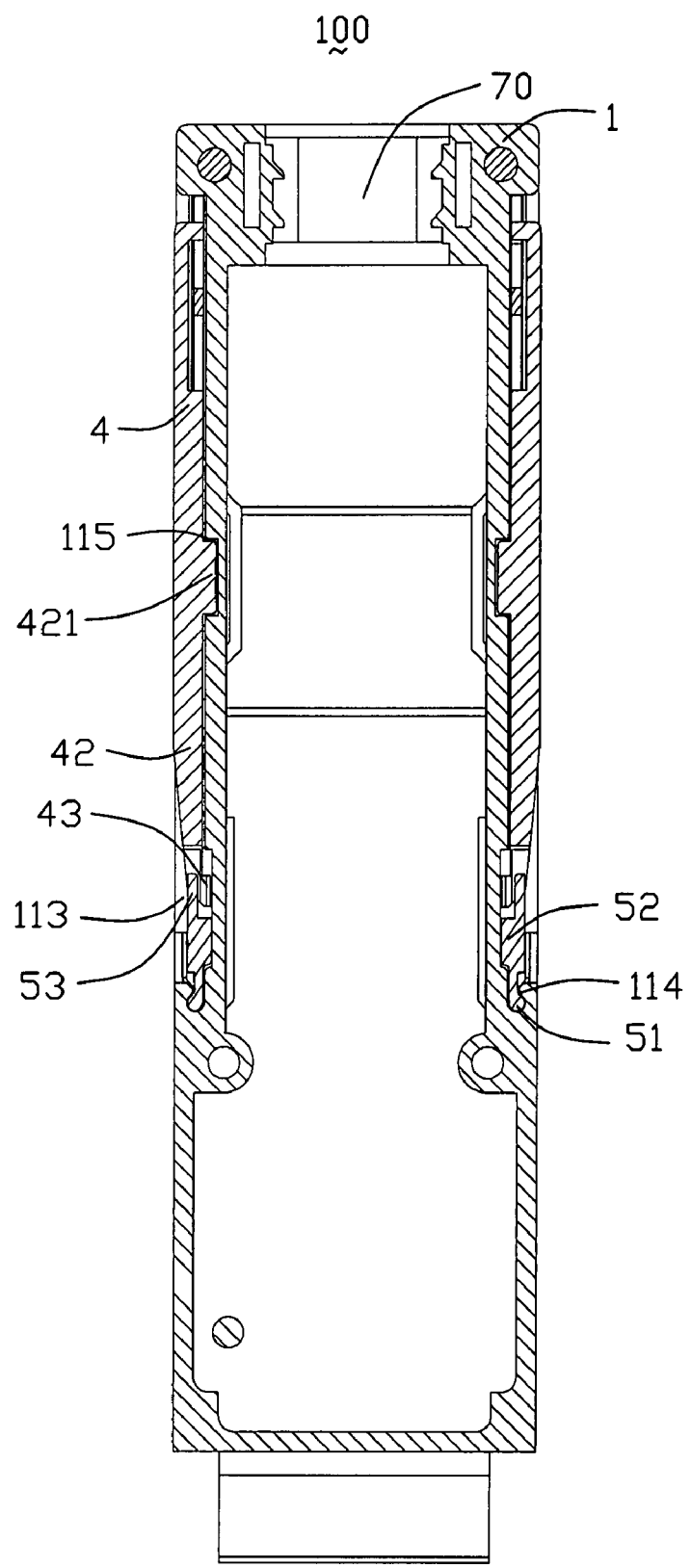
FIGS. 8-11 are cross-section views of the plug-in module taken along lines 8-8 to 11-11 of FIG. 6.
Figure 9:
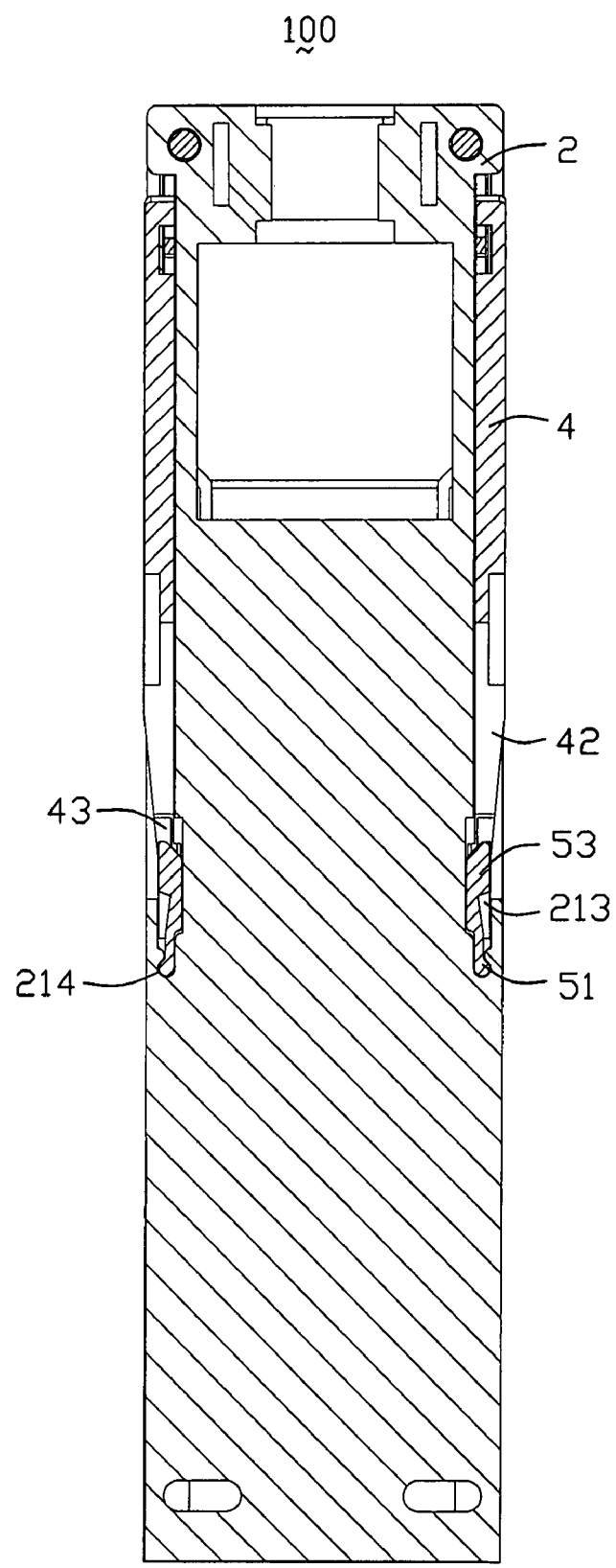

The bottom wall 20 comprises a front second mating section 202 and a rear second installation section 203 lower than the second mating section 202 to form a second flange 201 therebetween for indicating the final insertion position of the plug-in module 100 together with the first flange 101. The second rear wall 22 has a relatively large thickness along the mating direction and partially cut to form a semicircular second exit opening 220 which cooperates with the first exit opening 120 to form an exit channel 70 (FIG. 7) for the exist of the cable (no shown). The second rear wall 22 also defines a pair of circular second fastening holes 222 at opposite sides of the second exit opening 220 corresponding to the first fastening holes 122 for a pair of screws 9 protruding therethrough to fasten the base 2 with the cover 1. The bottom wall 20 extends beyond the second front wall 23 to form a second front flange 24 parallel spaced from the first front flange 14 with a front end of a printed circuit board (not shown), which is accommodated between the base 2 and the cover 1, exposed between the front flanges 14, 24.

Figure 10:
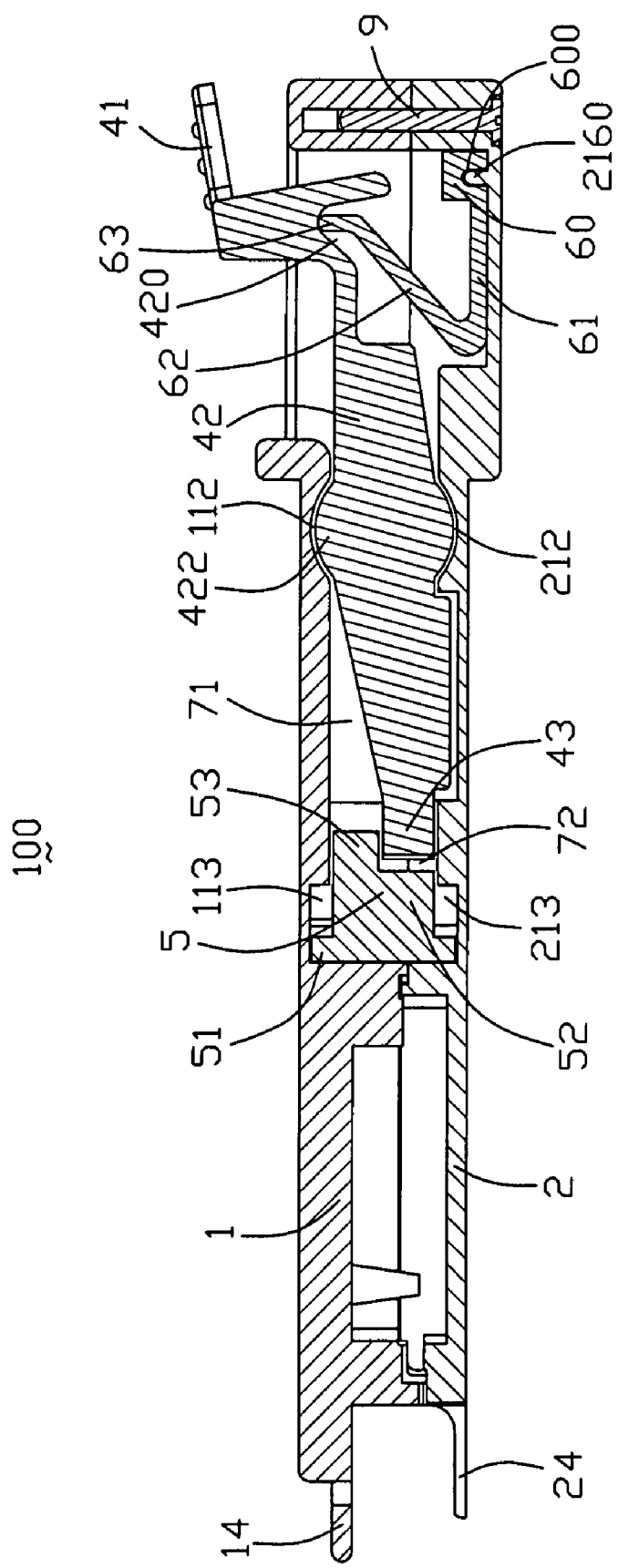
Figure 11:
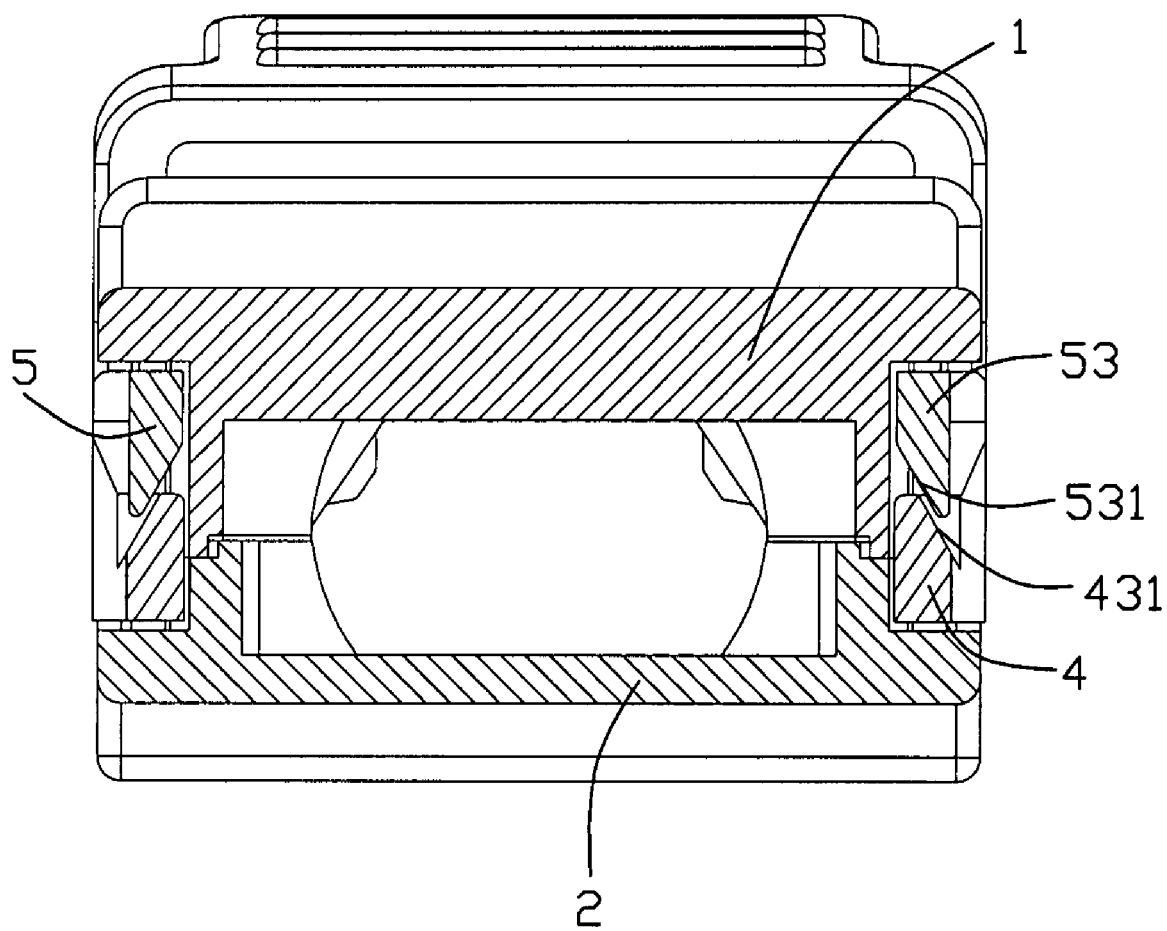

Each second sidewall 21 has different thicknesses along the mating direction of the plug-in module 100. The middle and rear sections of the sidewall 21 are thicker than front section of the sidewall 21 and form the thicker section of the sidewall 21 and the front section is a thinner section of the sidewall 21. The thicker section is partially cut to form a second accommodating space 210 which opens toward outside corresponding to the first accommodating space 110 of the cover 1 to corporately form an accommodating channel 71 of the plug-in module 100 to receive the actuating member 4. A deeper bias receiving slot 216 recesses upwardly into the second sidewall 21 and communicates with the second accommodating space 210. A projection 2160 (FIG. 10) is formed on the bottom of the bias receiving slot 216 to serve as position means for the bias elements 6. An arc-shape second rail recess 212 is recessed downwardly from outer part the second sidewall 12 corresponding to the first rail recess 112. A second pivot recess 215 is recessed inwardly from inner part of second sidewall 12 and locates below the second rail recess 212 corresponding to the first pivot recess 115. Particularly, the first pivot recess 115 is deeper than the second pivot recess 215, that is to say, the angle of the first pivot recess 115 is larger than that of the second pivot recess 215. A front second cooperating recess 213 corresponding to the first cooperating recess 113 is defined in the second sidewall 21 and communicates with the second accommodating space 210. A second pivot hole 214 is defined in a front end of the thicker section of the second sidewall 21 corresponding to the first pivot hole 114 and communicates with the second cooperating recess 213. Corresponding to the first and second steps 1130, 1132, the second cooperating recess 230 forms an inner first step 2130 on inner part of the second sidewall 21 and an outer second step 2132 on outer part of the second sidewall 21. A continuous rib 25 forms on inner periphery of the pair of second sidewalls 21 and the second rear wall 22 for being received in the continuous slot 15. A pair of tips 231 extends forwardly from forward ends of the pair of second sidewalls 21 and locates above the second front wall 23. A positioning slit 217 recesses downwardly from outer part of the second sidewall 21 and in front of the second rail recess 212 to communicate with the cooperating recess 213.

The actuating member 4 is assembled to the base 2 and the cover 1 to actuate the ejectors 5 outwardly move. The actuating member 4 comprises an n-shape operating portion 41 and a pair of actuating arms 42 extending forwardly from opposite lower ends of the operating portion 41. The operating portion 41 comprises an extrusion section 410 extending rearwardly from the horizontal section thereof and forming a plurality of ribs thereon for facilitating the operation of the user. Each actuating arm 42 is of spindly shape, that is to say, the actuating arm 42 comprises a wider middle section and a pair of narrower opposite front and rear ends. A substantially m-shape compressing opening 420 is defined in inner contour of the narrower rear end of each actuating arm 42. A column-shape spindle 421 protrudes from inner surface of one actuating arm 42 toward the other actuating arm 42. The location of the spindle 421 is at the wider middle section. A pair of arc-shape protuberances 422 protrude outwardly from upper and lower edges of the middle section of each actuating arm 42, and just locate to align with the spindle 421 along vertical direction. A positioning protrusion 423 is formed on lower edge of the actuating arm 42 and in front of the lower protuberance 422. An actuating end 43 is formed at distal end of each actuating arm 42. The actuating end 43 is of hook shape with a step 430 formed on inner periphery thereof. Upper and forward surfaces of the actuating end 43 are tapered to form an inclined actuating surface 431 and a tapered end 432.

The pair of ejectors 5 are assembled to the base 2 and the cover 1 to be actuated by the actuating member 4 for releasing the plug-in module 100 from the module receptacle. Each ejector 5 comprises a front pivot 51 vertically arranged for being received in the first and second pivot holes 114, 214, a main portion 52 extending rearwardly from the pivot 51, and a tapered cooperating end 53 formed at distal end of the main portion 52. The main portion 52 comprises an inner surface and an opposite outer surface. A first block rib 520 is formed with upper section of the main portion 52 and adjacent to the pivot 51 and a pair of wedge-shape cutouts 523 is defined at upper and lower sections of the main portion 52 to form a bridge 521 and a pair of bottom second block ribs 522. Lower surface and rearward surface of the cooperating end 53 are tapered to form an inclined cooperating surface 531 and a tapered end 532.

Each bias element 6 is substantially V-shape and comprises a n-shape positioning portion 60 with a positioning hole 600 defined therein and opening downwardly, a flat base portion 61 extending forwardly from lower end of the positioning portion 60, and an elastic spring arm 62 bending upwardly and rearwardly from distal end of the base portion 61 with a certain angle with the base portion 61. An upright free end 63 is formed at distal end of the spring arm 62.

Figure 4:
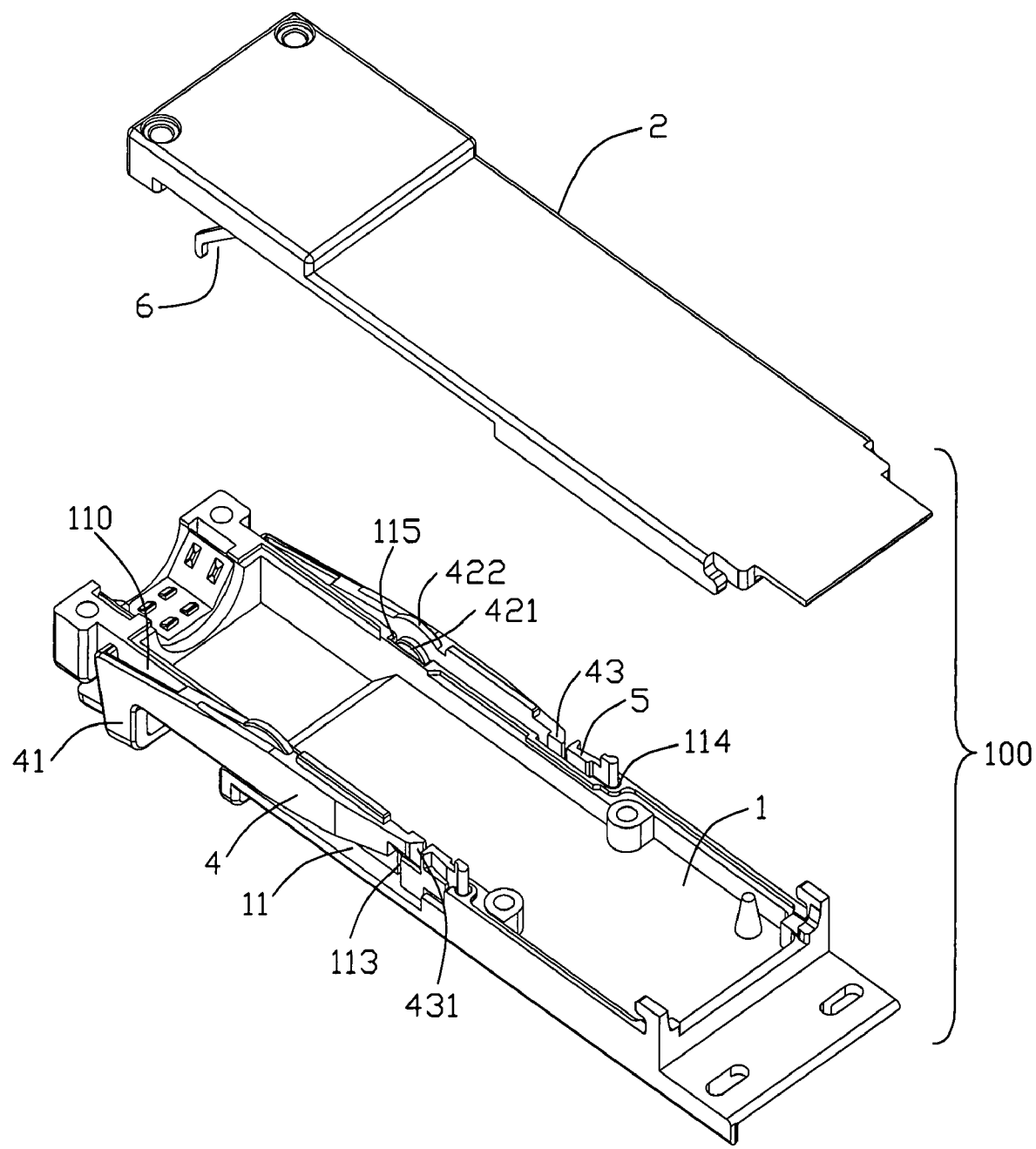
Figure 5:
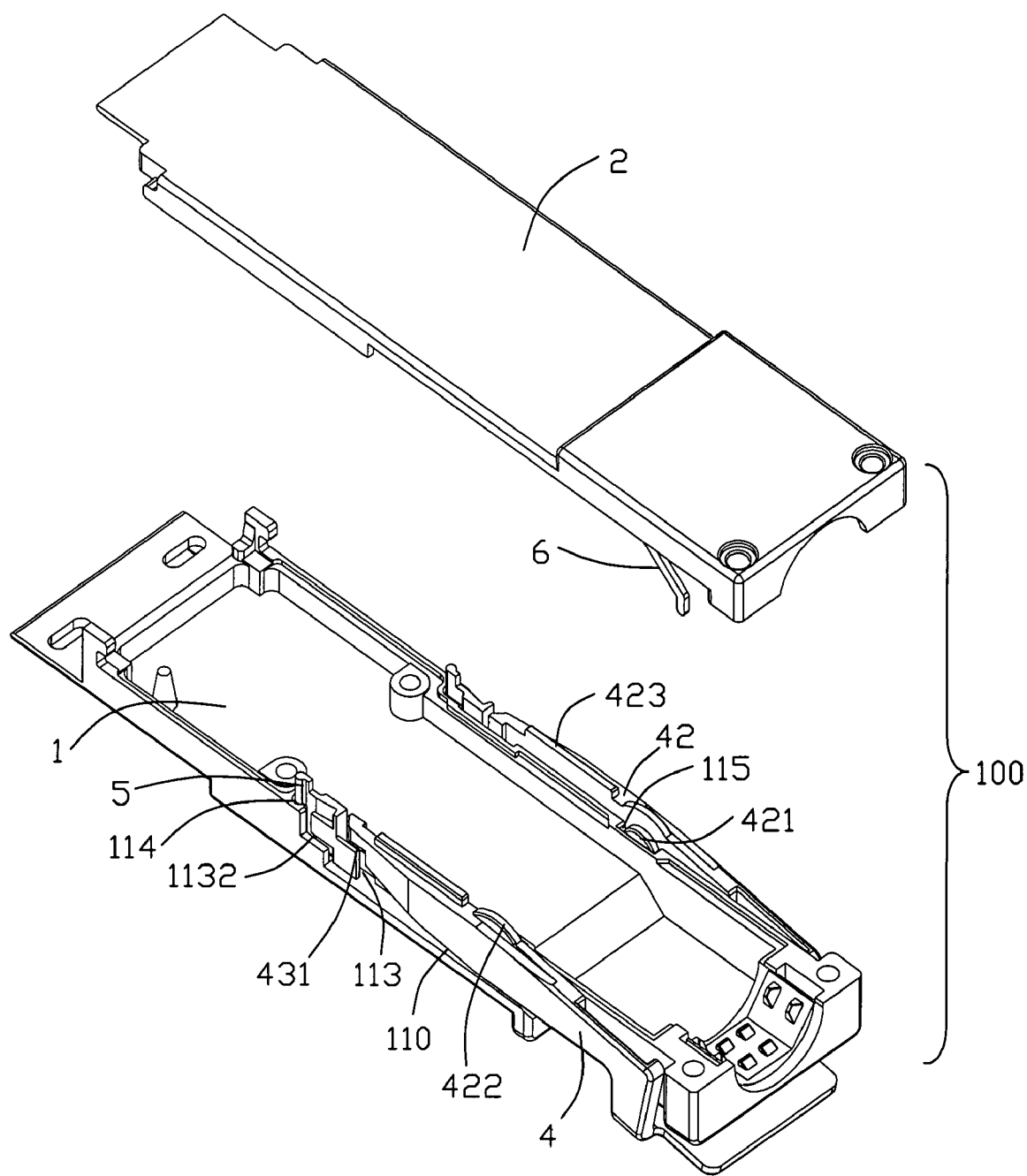

In assembly, referring to FIGS. 3-5 in conjunction with FIGS. 1-2, the bias elements 6 are assembled to the base 2, the actuating member 4 and the ejectors 5 are assembled to the cover 1.

The actuating member 4 are assembled to the cover 1 along down-to-up direction. The operating portion 41 locates above the cover 1 and upper portions of the pair of actuating arms 42 occupy the first accommodating spaces 110 with outer surfaces of the actuating member 4 substantially coplanar with the outer surfaces of the first sidewalls 1. Upper portions of the pair of spindles 421 are rotatably received in the first pivot recesses 115 of the first sidewalls 11, and the pair of upper protuberances 422 are respectively rotatably received in the pair of first rail recesses 112 of the pair of first sidewalls 11. The upper sections of the actuating ends 43 are received in the first cooperating recesses 113 with the steps 431 latching with the first step 1130. The ejectors 5 are assembled to the cover 1 with the pivots 51 inserted into the first pivot holes 114 and the main portions 52 and the cooperating ends 53 occupying the left spaces of the first cooperating recesses 113. In such circumstances, the actuating end 43 is located below the cooperating end 53 with the actuating surfaces 431, 531 attaching to each other. The L-shape second step 1132 abuts against the bridge 521 and the second block rib 522.

The pair of bias elements 6 are assembled to the base 2 with the base portion 61 and the positioning portion 60 received in the bias receiving slots 216 and the projections 2160 received in the positioning holes 600 to position the bias elements 6 to the base 2. The width of each bias receiving slot 216 is substantially equal to that of the bias element 6, thus, the positioning portion 60 and the base portion 60 are positioned by the bias receiving slot 216. The spring arm 62 is exposed beyond the bias receiving slot 216.

Figure 6:
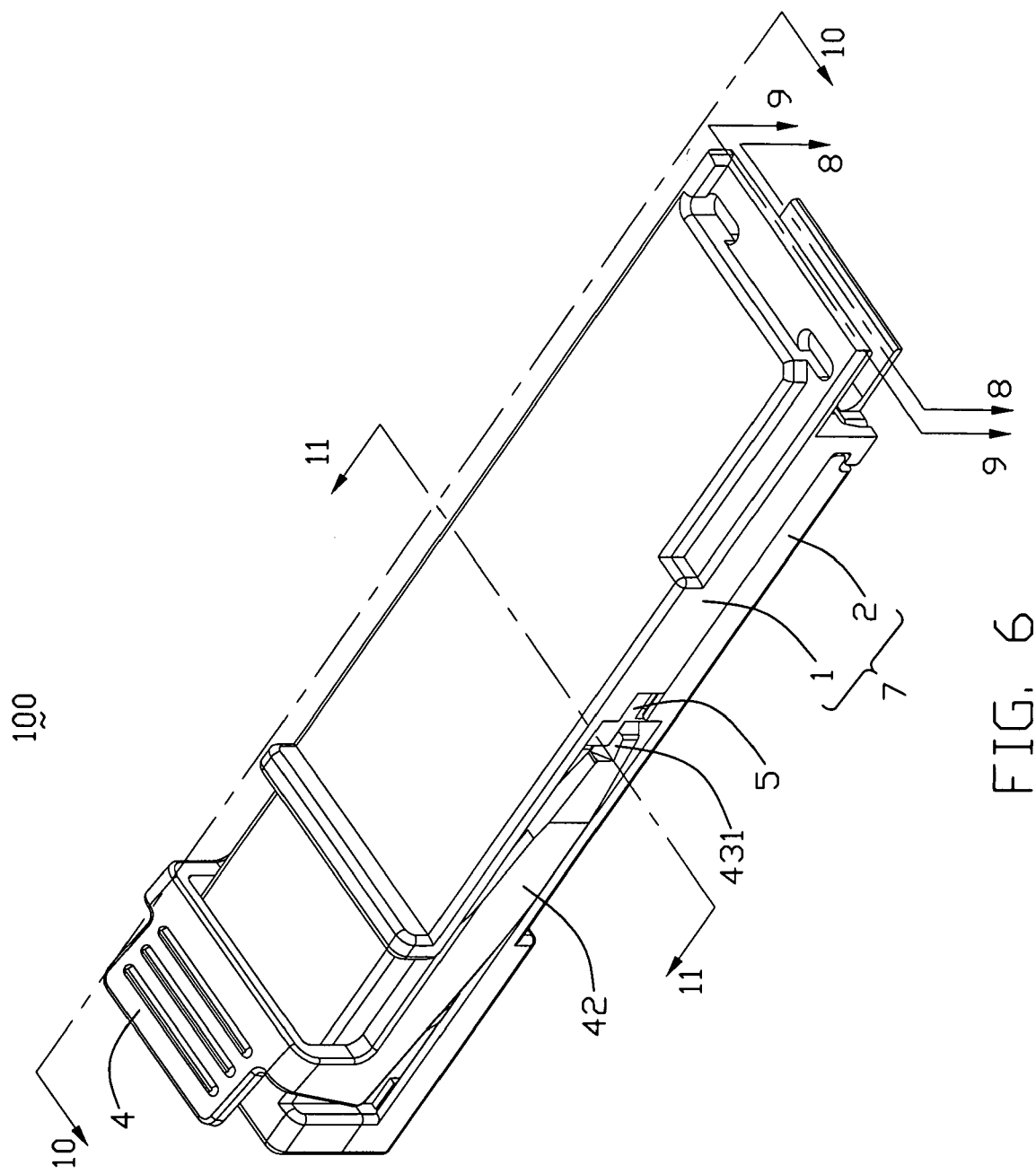
FIGS. 6-7 are assembled views of the plug-in module of FIGS. 1 and 2.

The base 2 is then assembled to the cover 1, the actuating member 4 and the ejectors 5 together with the pair of bias elements 6 with the pair of tips 231 inserted into the spaces 131 of the cover 1 then rotating the base 2 a certain angle to combine the base 2 and the cover 1 into the housing 7. The lower sections of the actuating arms 42, the actuating ends 43 and the ejectors 5 occupy the second accommodating space 210, the second cooperating recess 213 and the second pivot hole 214 in a manner similar to the assembly described above. The lower portions of the pair of spindles 421 are rotatably received in the second pivot recesses 215, and the lower protuberances 422 are rotatably received in the second rail recesses 212. The lower sections of the actuating ends 43 are received in the second cooperating recesses 213 with the steps 431 latching with the second steps 2130. The lower sections of the pivots 51 inserted into the second pivot holes 214. While, the lower sections of the main portions 52 and the cooperating ends 53 occupy the left spaces of the second cooperating recesses 213. The L-shape second step 2132 abuts against the bridge 521 and the other second block rib 522. The positioning protrusion 423 of each actuating arm 42 is received in the positioning slit 217. The spring arm 62 and the upright free end 63 of each bias element 6 are received in the compressing opening 420 of the actuating member 4. After such assembly, referring to FIGS. 6-7, since the spindly shape of the actuating arms 42, only the wider middle sections of the actuating arms 42 are sandwiched by the first and second sidewalls 11, 21. That is to say, the rear ends of the actuating arms 42 has some distance to the second sidewalls 21 which serves as operating space for the operating portion 41, and the front ends of the actuating arms 42 and the actuating ends 43 has some distances to the first and second sidewalls 11, 21 which serve as operating spaces for the actuating ends 43.

After the above assembly, the plug module 100 is achieved. The first and second accommodating spaces 110, 210 corporately form the accommodating channel 71 of the housing 7 to receive the actuating member 4, and the first and second cooperating recesses 113, 213 corporately form a cooperating space 72 of the housing 7 which is commonly used by the actuating member 4 and the ejectors 5. When removing the plug-in module 100 from the module receptacle, operator may exerts a downward force to the operating portion 41 of the actuating member 4, the spindles 421 and the arc-shape protuberances 422 rotate in the first and second rail recesses 112, 212 and the first and second pivot recesses 115, 215. Thus, the actuating arms 42 rotate along counter-clockwise direction with front ends thereof downwardly move and the actuating ends 43 upwardly move relative to the spindles 421 and the protuberances 422. Thus, the actuating surfaces 431 slide along the actuating surfaces 531 to actuate the pair of ejectors 5 outwardly move around the pivots 51 thereof. The outwardly moving ejectors 5 push tabs of the module receptacle outwardly move, then operator may pull the operating portion 41 rearwardly move to separate the plug-in module 100 from the module receptacle. At the same time, the spring arms 62 of the bias elements 6 are compressed by the actuating arms 42. When release the pulling force exerted to the operating portion 41, the compressed spring arms 62 of the bias elements 6 resume to their original statement, thus, providing elastic restore force to actuate the actuating member 4 and the ejectors 5 to their original positions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A plug-in module configured for latching engagement with a module receptacle adapted for mounting to a printed circuit board, comprising:

opposite sidewalls parallel to each other and extending along a longitudinal direction parallel to a mating direction of the plug-in module; and a latch mechanism comprising:

an actuating member rotatably assembled to the sidewalls and comprising a pair of actuating arms each formed with an actuating end at one distal end thereof, and an operating portion across the sidewalls along a lateral direction perpendicular to said longitudinal direction and connecting the other distal ends of the pair of actuating arms; and a pair of ejectors rotatably assembled to the sidewalls to cooperate with the actuating ends of the actuating member; and wherein the actuating member is configured and arranged such that movement of the operating portion thereof in up-to-down direction results in down-to-upward movement of the actuating arms and the actuating ends to thereby actuate the ejectors outwardly rotate relative to the sidewalls adapted for deflecting the latch tab of the module receptacle to separate the plug-in module from the module receptacle.

2. The plug-in module as claimed in claim 1, wherein the rotating direction of the actuating member is different from that of the ejectors.

3. The plug-in module as claimed in claim 1, further comprising a pair of bias elements partially received in the sidewalls and capable of being compressed by the actuating arms of the actuating member to provide elastic restore force to the actuating member.

4. The plug-in module as claimed in claim 3, wherein the sidewalls are first and second sidewalls combined together along vertical direction, and wherein each bias element comprises a base portion located in second sidewall, an elastic spring arm inclinedly extending from the base portion and being compressed by the actuating arm.

5. The plug-in module as claimed in claim 4, wherein each actuating arm defines a compressing opening to receive the elastic spring arm of the bias element, and wherein the elastic spring arm forms an upright free end compressed by the actuating arm.

6. The plug-in module as claimed in claim 4, wherein the base portion of each bias element defines a positioning hole at one end, and wherein the second sidewall forms a projection received in the positioning hole to position the bias element relative to the second sidewall.

7. The plug-in module as claimed in claim 1, wherein each sidewall defines an accommodating channel to accommodate the actuating arm therein, a pivot hole, and a cooperating space communicating with the accommodating channel and the pivot hole, and wherein the ejector forms a pivot rotatably received in the pivot hole and a cooperating end received in the cooperating space to contact the actuating end of the actuating arm.

8. The plug-in module as claimed in claim 1, further comprising a base and a cover respectively comprising first and second sidewalls, and wherein the actuating member and the ejectors are respectively rotatably attached to the first and second sidewalls of the base and the cover.

9. The plug-in module as claimed in claim 8, wherein the base forms a first flange at front end thereof, and the cover forms a second flange at front end thereof and parallel spaced from the first flange.

10. The plug-in module as claimed in claim 1, wherein each actuating am is of spindle shape with the actuating end is inclined to form an actuating surface.

11. The plug-in module as claimed in claim 1, further comprising a base and a cover, and wherein the operating portion is located above the cover for being compressed downwardly.

12. The plug-in module as claimed in claim 11, the base, the cover, and the latch mechanism are all die cast from metal material.

13. The plug-in module as claimed in claim 1, wherein the plug-in module is in accordance with QSFP (Quad Small Form-factor Pluggable) module standard.

* * * * *